US009549205B2

(12) United States Patent
Chang

(10) Patent No.: US 9,549,205 B2
(45) Date of Patent: Jan. 17, 2017

(54) METHOD AND DEVICE FOR ENCODING VIDEO

(71) Applicant: Novatek Microelectronics Corp., Hsinchu (TW)

(72) Inventor: Yu-Wei Chang, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 768 days.

(21) Appl. No.: 13/655,427

(22) Filed: Oct. 18, 2012

(65) Prior Publication Data
US 2014/0029669 A1   Jan. 30, 2014

(30) Foreign Application Priority Data

Jul. 27, 2012   (TW) .............................. 101127294 A

(51) Int. Cl.
*H04N 19/593*   (2014.01)
*H04N 19/51*   (2014.01)
(Continued)

(52) U.S. Cl.
CPC .............. *H04N 19/82* (2014.11); *H04N 19/51* (2014.11); *H04N 19/593* (2014.11); *H04N 19/61* (2014.11); *H04N 19/91* (2014.11)

(58) Field of Classification Search
None
See application file for complete search history.

(56) References Cited

U.S. PATENT DOCUMENTS 5,151,784 A * 9/1992 Lavagetto ............. G06T 7/2013
375/240.12
8,040,950 B2   10/2011 Ha et al.
(Continued)

FOREIGN PATENT DOCUMENTS

CN    1961582    5/2007
CN   101547354   9/2009
(Continued)

OTHER PUBLICATIONS

"Office Action of China Counterpart Application", issued on Feb. 4, 2016, p. 1-p. 7.
(Continued)

*Primary Examiner* — William C Vaughn, Jr.
*Assistant Examiner* — Lindsay Uhl
(74) *Attorney, Agent, or Firm* — Jianq Chyun IP Office

(57) ABSTRACT

A video encoding method for a video encoding device is provided. The method includes: obtaining a current image and a reference image, wherein the current image has a first block; obtaining motion vectors, wherein each of the motion vectors points to a reference block in the reference image; for each of the motion vectors, executing a filter calculation according to the pointed reference block and the first block to generate a first filter block, and calculating an difference value according to the pointed reference block and the corresponding first filter block. The method also includes: obtaining a minimum first difference value among the difference values, and obtaining a second filter block corresponding to the first difference value; encoding the first block according to the second filter block. Accordingly, the video quality and the compression ratio are increased.

12 Claims, 12 Drawing Sheets

(51) Int. Cl.
*H04N 19/82* (2014.01)
*H04N 19/61* (2014.01)
*H04N 19/91* (2014.01)

(56) References Cited

U.S. PATENT DOCUMENTS

| | | |
|---|---|---|
| 8,559,520 B2 | 10/2013 | Ha et al. |
| 2005/0220190 A1* | 10/2005 | Ha et al. .................. 375/240.16 |
| 2008/0247462 A1* | 10/2008 | Demos ..................... 375/240.03 |
| 2009/0245374 A1* | 10/2009 | Hsu et al. ................ 375/240.16 |
| 2010/0027655 A1 | 2/2010 | Matsuo et al. |
| 2010/0027665 A1 | 2/2010 | Pinhasov et al. |
| 2010/0111182 A1* | 5/2010 | Karczewicz et al. .... 375/240.16 |
| 2010/0226436 A1 | 9/2010 | Dane et al. |
| 2012/0033728 A1* | 2/2012 | Cho et al. ................ 375/240.03 |
| 2012/0039387 A1 | 2/2012 | Ha et al. |
| 2013/0129242 A1* | 5/2013 | Lin .......................... G06T 9/004 382/233 |

FOREIGN PATENT DOCUMENTS

| | | | | |
|---|---|---|---|---|
| CN | WO 2011150840 A1 * | 12/2011 | ............ | G06T 9/004 |
| TW | 201215154 | 4/2012 | | |
| TW | 201223249 | 6/2012 | | |
| WO | WO 2010087620 A2 * | 8/2010 | ............... | H04N 7/24 |
| WO | WO2011150840 A1 * | 12/2011 | | |

OTHER PUBLICATIONS

"Office Action of Taiwan Counterpart Application", issued on Jun. 29, 2015, p. 1-p. 8.

\* cited by examiner

METHOD AND DEVICE FOR ENCODING VIDEO

CROSS-REFERENCE TO RELATED APPLICATION

This application claims the priority benefit of Taiwan application serial no. 101127294, filed on Jul. 27, 2012. The entirety of the above-mentioned patent application is hereby incorporated by reference herein and made a part of this specification.

BACKGROUND

Field of the Invention

The present invention is directed to a video encoding method and a video encoding device.

Description of Related Art

During video encoding, an image is typically divided into a plurality of macro blocks, a macro block may include one or more blocks. If a temporal redundancy is to be identified in a video, a motion vector of a block is searched. A process of searching for the motion vector is also referred to as motion estimation. A motion vector is a vector pointing from a block in a current image to a block in a reference image. An encoder estimates the block in the current image by using the block in the reference image and generates an estimated residual value. The encoder performs operations on the generated residual value, such as transformation, quantization, entropy coding and so forth.

However, there is usually noise in an image, which may be eliminated by a filter calculation. Filters may be classified as spatial and temporal filters. If a temporal filter is used, a reference image is also referenced. Thus, how to perform the filter calculation while performing video encoding is an important concern to persons skilled in this field.

SUMMARY

According to an embodiment of the present invention, a video encoding method and a video encoding system are introduced, which are capable of performing a filter calculation while performing encoding.

According to an embodiment of the present invention, a video encoding method for a video encoding device is introduced. The method includes steps as follows. A current image and a reference image are obtained, wherein the current image includes a first block. A plurality of motion vectors is obtained, wherein each of the motion vectors points to a reference block in the reference image. For each of the motion vectors, a filter calculation is executed according to the pointed reference block and the first block to generate a first filter block, and a difference value is calculated according to the pointed reference block and the corresponding first filter block. The method further includes steps as follows. A minimum first difference value among the difference values is obtained. A second filter block corresponding to the first difference value is obtained. The first block is encoded according to the second filter block.

In an embodiment, the step of calculating the difference value according to the pointed reference block and the corresponding first filter block for each of the motion vectors includes the following steps. A detail preservation calculation executed according to the first filter block and the first block to obtain a detail preservation block. The difference value between the detail preservation block and the pointed reference block is calculated. The step of encoding the first block according to the second filter block includes the following steps. A first reference block corresponding to the second filter block is obtained a among the reference blocks. The detail preservation block corresponding to the second filter block is obtained. A residual value between the detail preservation block and the first reference block is encoded.

In an embodiment, the step of encoding the first block according to the second filter block includes the following steps. A zero reference block is obtained a from the reference image, wherein a coordinate of the zero reference block in the reference image is equal to a coordinate of the first block in the current image. The filter calculation is executed according to the zero reference block and the first block to obtain a third filter block. The filter calculation is executed according to the second filter block and the third filter block to obtain a fourth filter block. A second block adjacent to the first block in the current image is obtained. The fourth filter block is estimated according to the second block to obtain a residual value and encoding the residual value.

In an embodiment, the step of encoding the first block according to the second filter block includes the following steps. A zero reference block in the reference image is obtained, wherein a coordinate of the zero reference block in the reference image is equal to a coordinate of the first block in the current image. The filter calculation is executed according to the zero reference block and the first block to obtain a third filter block. The filter calculation is executed according to the second filter block and the third filter block to obtain a fourth filter block. A first reference block corresponding to the second filter block is obtained. A residual value between the first reference block and the fourth filter block is encoded.

In an embodiment, before the step of obtaining the plurality of motion vectors, the method includes the following steps. A plurality of coarse motion vectors is obtained, wherein each of the coarse motion vectors points to a second reference block in the reference image. A third difference value between the pointed second reference block and the first block is calculated for each of the coarse motion vectors. A minimum fourth difference value among the third difference values is obtained. A first coarse motion vector corresponding to the fourth difference value is obtained. A plurality of fined motion vectors is obtained. The motion vectors are generated according to the fined motion vectors and the first coarse motion vector.

In an embodiment, a horizontal component and a vertical component of each of the coarse motion vectors are integers, and a horizontal component and a vertical component of each of the fined motion vectors are decimals smaller than 1.

In an embodiment, the video encoding method further includes the following steps. A coarse motion vector and a fourth block in the current image are obtained, wherein the coarse motion vector points to a first reference block in the reference image. The filter calculation is executed according to the first reference block and the fourth block to obtain a second filter block. A detail preservation calculation is executed according to the second filter block and the fourth block to obtain a detail preservation block. A plurality of first motion vectors according to the coarse motion vector is generated, wherein each of the first motion vectors points to a second reference block in the reference image. A third difference value between each of the second reference blocks and the detail preservation block is calculated. A minimum fourth difference value among the third difference values is obtained. A first detail preservation block corresponding to the fourth difference value is obtained. The fourth block is encoded according to the first detail preservation block.

In an embodiment, the first block belongs to one of multiple block types. Before the step of obtaining the motion vectors, the method includes the following steps. A plurality of first motion vectors belonging to each of the multiple block types is obtained, wherein each of the first motion vectors points to a first reference block in the reference image. A first difference value is calculated according to the pointed first reference block and the first block for each of the first motion vectors belonging to each of the block types. A minimum second difference value among the first difference values is obtained. A second motion vector corresponding to the second difference value for each of the block types is obtained. The second motion vectors are the motion vectors.

According to another embodiment of the present invention, a video encoding device including a motion estimation circuit, a filter calculation circuit and an encoding circuit is introduced. The motion estimation circuit is configured to obtain a current image and a reference image, wherein the current image includes a first block. The filter calculation circuit is coupled to the motion estimation circuit and configured to execute a filter calculation. The encoding circuit is coupled to the motion estimation circuit and the filter calculation circuit. The motion estimation circuit is configured to obtain a plurality of motion vectors. Each of the motion vectors points to a reference block in the reference image. For each of the motion vectors, the filter calculation circuit is configured to execute the filter calculation according to the pointed reference block and the first block to generate a first filter block. The motion estimation circuit is configured to calculate a difference value according to the pointed reference block and the corresponding first filter block. The motion estimation circuit is configured to obtain a minimum first difference value among the difference values. The filter calculation circuit is configured to obtain a second filter block corresponding to the first difference value. The encoding circuit is configured to encode the first block according to the second filter block.

In an embodiment, for each of the motion vectors, the filter calculation circuit is further configured to execute a detail preservation calculation according to the corresponding first filter block and the first block to obtain a detail preservation block. The motion estimation circuit is further configured to calculate the difference value between the detail preservation block and the pointed reference block. The encoding circuit is further configured to obtain a first reference corresponding to the second filter block, obtain the detail preservation block corresponding to the second filter block and encode a residual value between the detail preservation block and the first reference block.

In an embodiment, the filter calculation circuit is further configured to obtain a zero reference block in the reference image. A coordinate of the zero reference block in the reference image is equal to a coordinate of the first block in the current image. The filter calculation circuit is further configured to execute the filter calculation according to the zero reference block and the first block to obtain a third filter block and execute the filter calculation according to the second filter block and the third filter block to obtain a fourth filter block. The encoding circuit further configured to obtain a second block adjacent to the first block in the current image, estimate the fourth filter block according to the second block to obtain a residual value and encode the residual value.

In an embodiment, the filter calculation circuit is further configured to obtain a zero reference block in the reference image. A coordinate of the zero reference block in the reference image is equal to a coordinate of the first block in the current image. The filter calculation circuit is further configured to execute the filter calculation according to the zero reference block and the first block to obtain a third filter block and execute the filter calculation according to the second filter block and the third filter block to obtain a fourth filter block. The encoding circuit is further configured to obtain a first reference block corresponding to the second block and encode a residual value between the first reference block and the fourth filter block.

In an embodiment, the motion estimation circuit is further configured to obtain a plurality of coarse motion vectors, wherein each of the coarse motion vectors points from the first block to the second reference block in the reference image. For each of the coarse motion vectors, the motion estimation circuit is further configured to calculate a third difference value between the pointed second reference block and the first block. The motion estimation circuit is further configured to obtain a minimum fourth difference value among the third difference values, obtain a first coarse motion vector corresponding to the fourth difference value, obtain a plurality of fined motion vectors and generate the motion vectors according to the fined motion vectors and the first coarse motion vector.

In an embodiment, a horizontal component and a vertical component of each of the coarse motion vectors are integers, and a horizontal component and a vertical component of each of the fined motion vectors are decimals smaller than 1.

In an embodiment, the motion estimation circuit is further configured to obtain a coarse motion vector and a fourth block in the current image. The coarse motion vector points to the first reference block in the reference image. The filter calculation circuit is further configured to execute the filter calculation according to the first reference block and the fourth block to obtain the second filter block and execute the detail preservation calculation according to the second filter block and the fourth block to obtain a detail preservation block. The motion estimation circuit is further configured to generate a plurality of first motion vectors according to the coarse motion vector, wherein each of the first motion vectors points to a second reference block in the reference image. The motion estimation circuit is further configured to calculate a third difference value between each of the second reference blocks and the detail preservation block and obtain a minimum fourth difference value among the third difference values. The encoding circuit is further configured to obtain a first detail preservation block corresponding to the fourth difference value and encode the fourth block according to the first detail preservation block.

In an embodiment, the first block belongs to one of multiple block types. The motion estimation circuit is further configured to obtain a plurality of first motion vectors belonging to each of the multiple block types, wherein each of the first motion vectors points to a first reference block in the reference image. For each of the first motion vectors belonging to each of the block types, the motion estimation circuit is further configured to calculate a first difference value according to the pointed first reference block and the first block. For each of the block types, the motion estimation circuit is further configured to obtain a minimum second difference value among the first difference values and obtain a second motion vector corresponding to the second difference value. The second motion vectors are the motion vectors.

Based on the above, the video encoding method and the video encoding device according to the embodiments of the present invention search for the motion vector according to a result of the filter calculation. Thus, compression ratio and video quality can be increased.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DESCRIPTION OF EMBODIMENTS

[First Embodiment]

Figure 1:
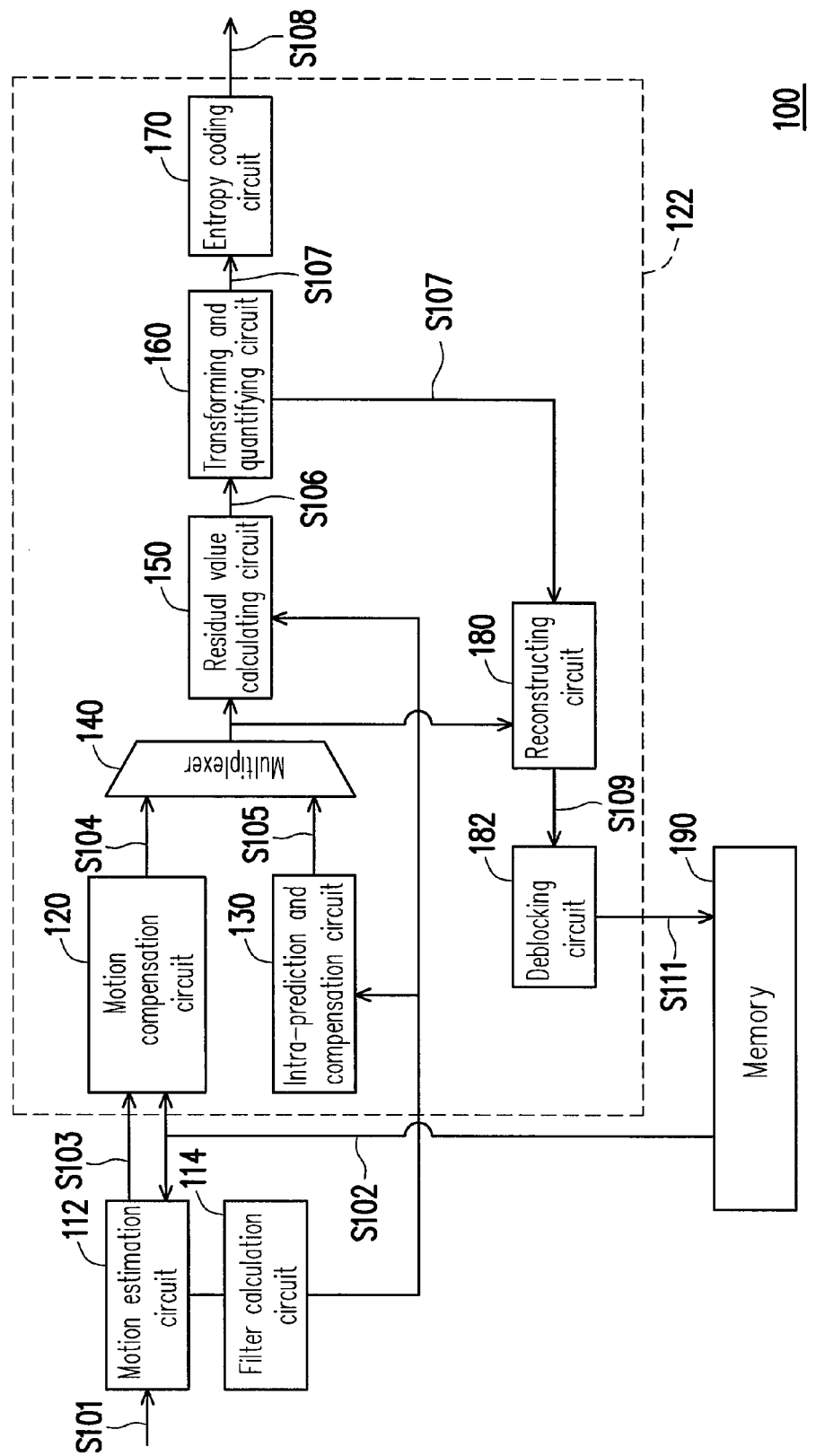
FIG. 1 is a block diagram illustrating a video encoding device according to an embodiment of the present invention.

FIG. 1 is a block diagram illustrating a video encoding device according to an embodiment of the present invention.

Referring to FIG. 1, a video encoding device 100 is configured to encode an image to generate a bit stream for the video. The video encoding device 100 includes a motion estimation circuit 112, a filter calculation circuit 114, a motion compensation circuit 120, an intra-prediction and compensation circuit 130, a multiplexer 140, a residual value calculating circuit 150, a transforming and quantifying circuit 160, an entropy coding circuit 170, a reconstructing circuit 180, a deblocking circuit 182 and a memory 190. The video encoding device 100 may be deployed in a computer, a smart phone, a digital video camera, a digital camera or a server, and the present invention is not limited thereto. The motion compensation circuit 120, the intra-prediction and compensation circuit 130, the multiplexer 140, the residual value calculating circuit 150, the transforming and quantifying circuit 160, the entropy coding circuit 170, the reconstructing circuit 180 and the deblocking circuit 182 may also be collectively referred to as an encoding circuit 122.

The motion estimation circuit 112 receives a current image S101 in a video and obtains a reference image S102 from the memory 190. For a macro block currently to be encoded, i.e. a current macro block, the motion estimation circuit 112 uses a block as a unit to execute motion estimation according to the current image S101 and the reference image S102 and obtain a motion vector S103. In other words, when a macro block is divided into a plurality of blocks, the number of the motion vectors S103 is greater than 1.

The filter calculation circuit 114 executes a filter calculation according to the current image S101 and the reference image S102. Specially, a result of the filter calculation is transmitted to the motion estimation circuit 112. The result that how the filter calculation influences the motion estimation will be described in detail below.

The motion compensation circuit 120 executes motion compensation according to the motion vectors S103 to generate a predicted macro block S104. The macro block S104 is configured to remove a temporal redundancy.

The intra-prediction and compensation circuit 130 generates a predicted macro block S105 according to information of the current image S101. The macro block S105 is configured to remove a spatial redundancy.

The multiplexer 140 selects one from the macro block S104 and the macro block S105 and transmits the selected one to the residual value calculating circuit 150

The macro block S104 and the macro block S105 are configured to predict pixel values of a current macro block, and thus, the residual value calculating circuit 150 generates residual values of the current macro block according to the predicting result. For example, the residual value calculating circuit 150 calculates residual values S106 resulted from all pixel values in the current macro block minus pixel values of corresponding positions in the predicted macro block.

The transforming and quantifying circuit 160 performs transforming and quantifying operations on the residual value S106. For instance, the transforming operation is a discrete cosine transforming (DCT) operation. After the transforming and quantifying operations are performed, the transforming and quantifying circuit 160 generates a coefficient S107.

The entropy coding circuit 170 executes an entropy coding on the coefficient S107. For example, the entropy coding operation includes run-length coding, Huffman coding, arithmetic coding, and the present invention is not limited thereto. Lastly, the entropy coding circuit 170 generates a bit stream S108 of the current macro block.

However, in order to synchronize with a decoding apparatus, the video encoding device 100 also reconstructs an image after encoding the current image S101. In particular, the reconstructing circuit 180 reconstructs an image S109 according to the predicted macro block S104 or S105 and the coefficient S107. Each pixel in the reconstructed image S109 is approximate to each pixel in the current image S101, but a difference may exist therebetween. Such difference is resulted from the quantifying operation.

The deblocking circuit 182 performs a deblocking operation on the reconstructed image S109. Since the reconstructed image S109 is established by using a macro block as a unit, a visual discontinuity may occur in adjacent macro blocks. After the deblocking operation, such visual discontinuity may be mitigated. Finally, the deblocking circuit 182 generates an image S111 and stores the same in the memory 190. After completing encoding the current image S101, the video encoding device 100 receives the next image, and the image S111 becomes the reference image of the next image accordingly.

In the present embodiment, each of the current image S101, the reference image S102 and the image S111 is referred to as a frame. However, in other embodiments, each of the current image S101, the reference image S102 and the image S111 may be also referred to as a field. In addition, the pixel values included in a macro block may be pixel values representing luminance or chrominance, and the present invention is not limited thereto.

Figure 2:
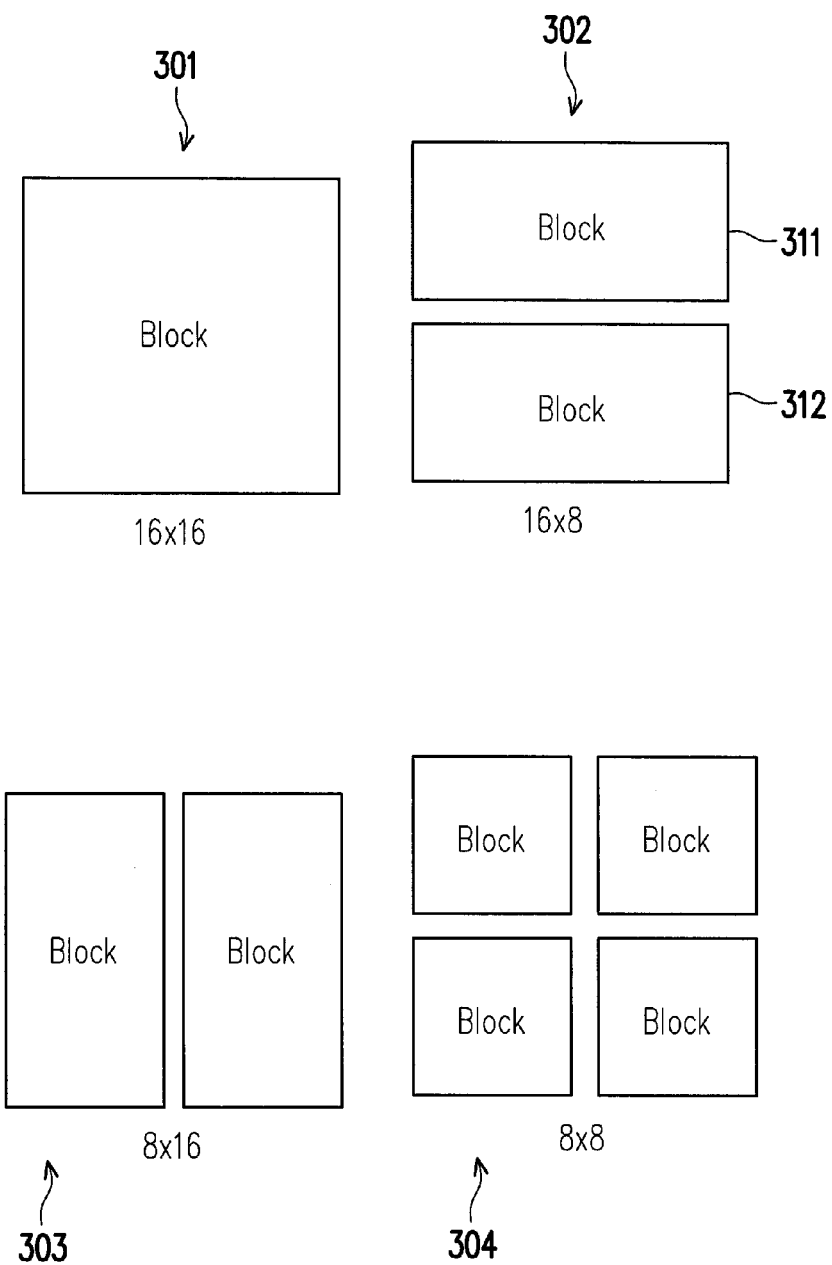
FIG. 2 is a schematic diagram illustrating block types according to an embodiment of the present invention.

FIG. 2 is a schematic diagram illustrating block types according to an embodiment of the present invention.

Referring to FIG. 2, a macro block may be divided as block types 301~304. In different block types, a macro block is divided as different numbers of blocks that are in different sizes. In the present embodiment, both a width and a height of a macro block are 16 pixel values. In other embodiments, a width and a height of a macro block may be 32 or 64 pixel values, but the present invention is not limited thereto.

In the block type 301, a macro block is only divided as a block, and a width and a height thereof are 16 pixel values.

In the block type 302, a macro block is divided as blocks 311 and 312. Each of both the blocks 311 and 312 has a width of 16 pixel values and a height of 8 pixel values. When performing motion estimation, the motion estimation circuit 112 generates a plurality of motion vectors belonging to the block 311 and a plurality of motion vectors belonging to the block 312.

In the block type 303, a macro block is divided as two blocks, and each of both blocks has a width of 8 pixel values and a height of 16 pixel values.

In the block type 304, a macro block is divided as four blocks, and each of the blocks has a width and a height of 8 pixel values.

The motion estimation circuit 112 selects one block type from the block types 301~304 to encode a macro block. The basis for such selection may be selecting a block type having the highest compression ratio, but the present invention is not limited thereto. In particular, when performing the motion estimation, the motion estimation circuit 112 generates a plurality of motion vector for each block of each block type and calculates a plurality of difference values according to the motion vectors. The motion estimation circuit 112 selects a block type according to the difference values and selects one or more corresponding motion vectors. For example, when every pixel value in a macro block is approximate with the each other, the block type 301 has the higher possibility to be selected. When a macro block has a horizontal edge, the block type 302 has the higher possibility to be selected. However, in other embodiments, the motion estimation circuit 112 may also configure other block types, but the present invention is not limited thereto.

Figure 3:
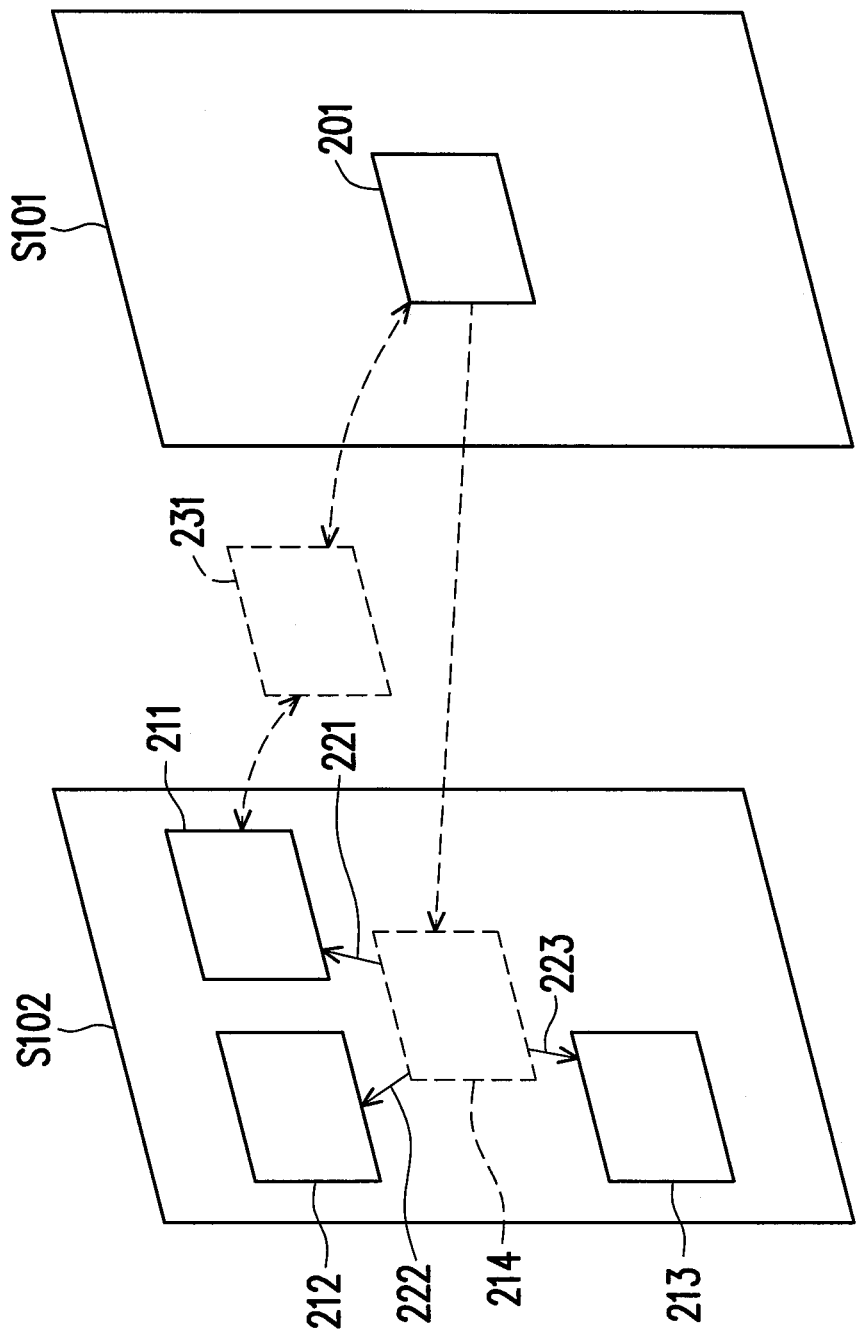
FIG. 3 is a schematic diagram illustrating motion estimation according to an embodiment of the present invention.

FIG. 3 is a schematic diagram illustrating motion estimation according to an embodiment of the present invention.

Referring to FIG. 3, the motion estimation circuit 112 firstly obtains the current image S101 and the reference image S102. The current image S101 includes a block 201 (i.e. a first block) currently to be encoded. The reference image S102 includes a reference block 214. A coordinate of the block 201 in the current image S101 is equal to a coordinate of the reference block 214 in the reference image S102. The block 201 and the reference block 214 has the same size (i.e. the same width and the height), and the reference block 214 may be also referred to as a zero reference block. It should be noticed that the block 201 belongs to a macro block whose block type may be any one of the block types 301~304. FIG. 3 is merely used for describing the motion estimation while calculating a certain block type.

The motion estimation circuit 112 obtains motion vectors 221~223. The motion vector 221 points from the reference block 214 to the reference block 211 on the reference image S102. The motion vector 222 points from the reference block 214 to the reference block 212. The motion vector 223 points from the reference block 214 to the reference block 213. The motion estimation circuit 112 searches for one from the reference blocks 211~213 that is the most similar to the block 201.

Each of the motion vectors 221~223 includes a horizontal component and a vertical component. The reference block 214 corresponds to a motion vector having a 0 horizontal component and a 0 vertical component. The motion vectors 221~223 may be generated based on any one of algorithms (e.g. the diamond search algorithm), but the present invention is not intent to limit how to generate the motion vectors 221~223. Besides, the motion estimation circuit 112 may also generate motion vectors more or less than the number of the motion vectors 221~223. Or otherwise, in another embodiment, the motion estimation circuit 112 may use a plurality of reference images and generate a plurality of motion vectors in each of the reference images. The present invention is not intent to limit the number of the reference images.

For each of the motion vectors, the filter calculation circuit 114 executes a filter calculation accordion to the pointed reference block and the block 201. Taking the motion vector 221 for example, if a pixel value in the block 201 is represented as C, and the corresponding pixel value in the reference block 211 is represented as R, then the filter calculation circuit 114 executes the filter calculation based on formula (1) as below.

$$C'=w_1R+w_2C \tag{1}$$

Therein, $w_1$ and $w_2$ are real numbers and represent weights in the filter calculation. In an embodiment, the sum of $w_1$ $w_2$ is 1, but the present invention is not intent to limit the values of $w_1$ and $w_2$. Otherwise, the filter calculation circuit 114 may also generate C' by using C, the 8 pixel values surrounding C, R and the 8 pixel values surrounding R, but the present invention is not intent limit the number of pixels required by the filter. When each pixel value in the block 201 and the reference block 211 is calculated by formula (1), all the pixel values C' forms a filter block 231 (i.e. a first filter block). The motion estimation circuit 112 calculates an difference value according to the reference block 211 and the filter block 231. For example, the motion estimation circuit 112 may calculate a sum of absolute difference (SAD) between the reference block 211 and the filter block 231. Otherwise, the motion estimation circuit 112 may also calculate the difference value by using a sum of absolute transformed differences (SATD), but the present invention is not limited thereto. Here, the motion vector 221, the reference block 221, the filter block 231 and the difference value generated therefrom correspond to each other. In this specification, when speaking a difference value corresponding to a reference block, it represents that the difference value is calculated based on the reference block, which will not be repeated hereinafter.

Similarly, for the motion vector 222, the filter calculation circuit 114 executes the filter calculation as formula (1) according to the reference block 212 and the block 201 to generate a filter block (i.e. a first filter block). Besides, the motion estimation circuit 112 generates a difference value according to the reference block 212 and the filter block.

For motion vector 223, the filter calculation circuit 114 executes the filter calculation as formula (1) according to the reference block 213 and the block 201 to generate a filter block (i.e. a first filter block). Besides, the motion estimation circuit 112 generates a difference value according to the reference block 213 and the filter block.

For each block type, the motion estimation circuit 112 generates a plurality of difference values according to the above-described method. The motion estimation circuit 112 identifies a minimum from the generated difference values, i.e. a first difference value. Here, it is assumed that the difference value corresponding to the motion vector 221 is the first difference value. The motion estimation circuit 112 obtains the filter block 231 corresponding to the first difference value, which is now referred to as a second filter block. Next, the encoding circuit 122 encodes the block 201 according to the filter block 231.

To be specific, the motion compensation circuit 120 obtains the reference block 211 (i.e. a first reference block) according to the motion vector 221. The multiplexer 140 transmits the reference block 211 to the residual value calculating circuit 150. The residual value calculating circuit 150 calculates a residual value between the reference block 211 and the filter block 231. The transforming and quantifying circuit 160 and the entropy coding circuit 170 encode the residual value.

In addition, reconstructing circuit 180 reconstructs a block according to an encoding result (e.g. the coefficient 5107 as shown in FIG. 1) of the block 201 and stores the same in the memory 190.

Figure 4:
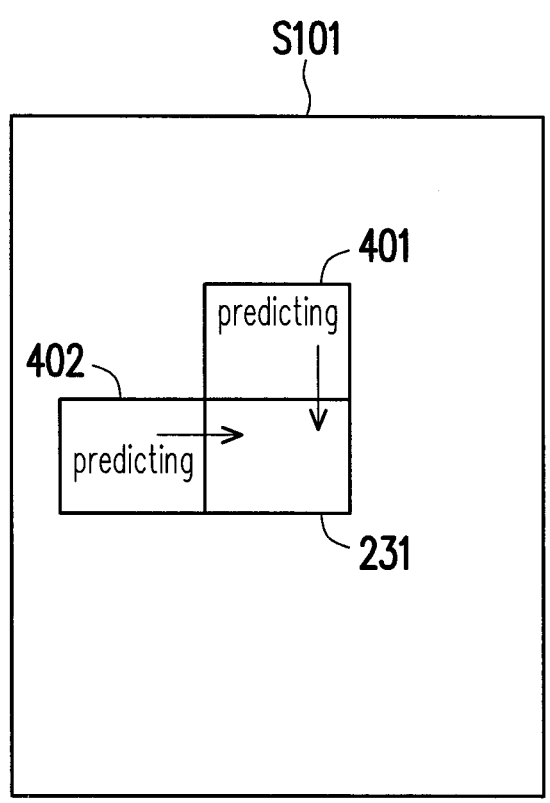
FIG. 4 is a schematic diagram illustrating an internal estimation according to an embodiment of the present invention.

FIG. 4 is a schematic diagram illustrating an internal estimation according to an embodiment of the present invention.

Referring to FIG. 4, the filter block 231 is located at the position of the block 201. When encoding the block 201 by using an intra-predicting method, the intra-prediction and compensation circuit 130 obtains blocks 401 and 402 adjacent to the block 201. The blocks 401 and 402 are blocks that have been encoded and reconstructed. The intra-prediction and compensation circuit 130 generates a predicted blocks according to the blocks 401 and 402. The residual value calculating circuit 150 calculates residual values between the predicted blocks and the filter block 231. Then, the transforming and quantifying circuit 160 and the entropy coding circuit 170 encode the residual values.

Figure 5:
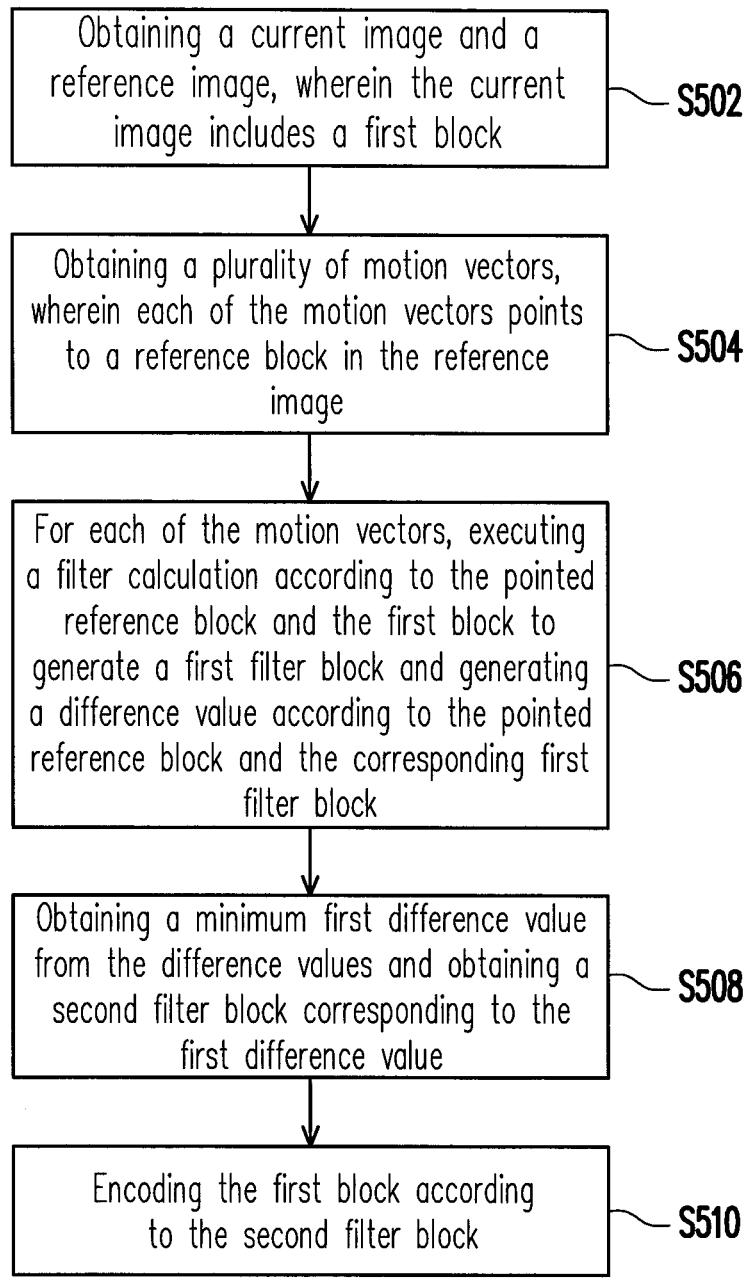
FIG. 5 is a flowchart illustrating a video encoding method according to an embodiment of the present invention.

FIG. 5 is a flowchart illustrating a video encoding method according to an embodiment of the present invention.

Referring to FIG. 5, in step S502, the motion estimation circuit 110 obtains a current image and a reference image, wherein the current image includes a first block.

In step S504, the motion estimation circuit 110 obtains a plurality of motion vectors, and each of the motion vectors points to a reference block in the reference image.

In step S506, for each of the motion vectors, the filter calculation circuit 114 executes a filter calculation according to the pointed reference block and the first block to generate a first filter block, and the motion estimation circuit 112 generates a difference value according to the pointed reference block and the corresponding first filter block.

In step S508, the motion estimation circuit 110 obtains a minimum first difference value from the difference values and obtains a second filter block corresponding to the first difference value.

In step S510, the encoding circuit 122 encodes the first block according to the second filter block. It should be noted that the step S510 indicates generating the bit stream representing the first block according to the second filter block, but not necessarily encoding the pixel values in the first block. For example, the encoding circuit 122 encodes a residual value between the second filter block and a reference block to generate a bit stream representing the first block.

Each step of FIG. 5 has been described as above and will not be repeated hereinafter.

[Second Embodiment]

The second embodiment is similar to the first embodiment, and thus, only the different places will be described herein. In the second embodiment, when the motion estimation is completed, the video encoding device 100 further encodes a block by using a zero reference block.

Figure 6A:
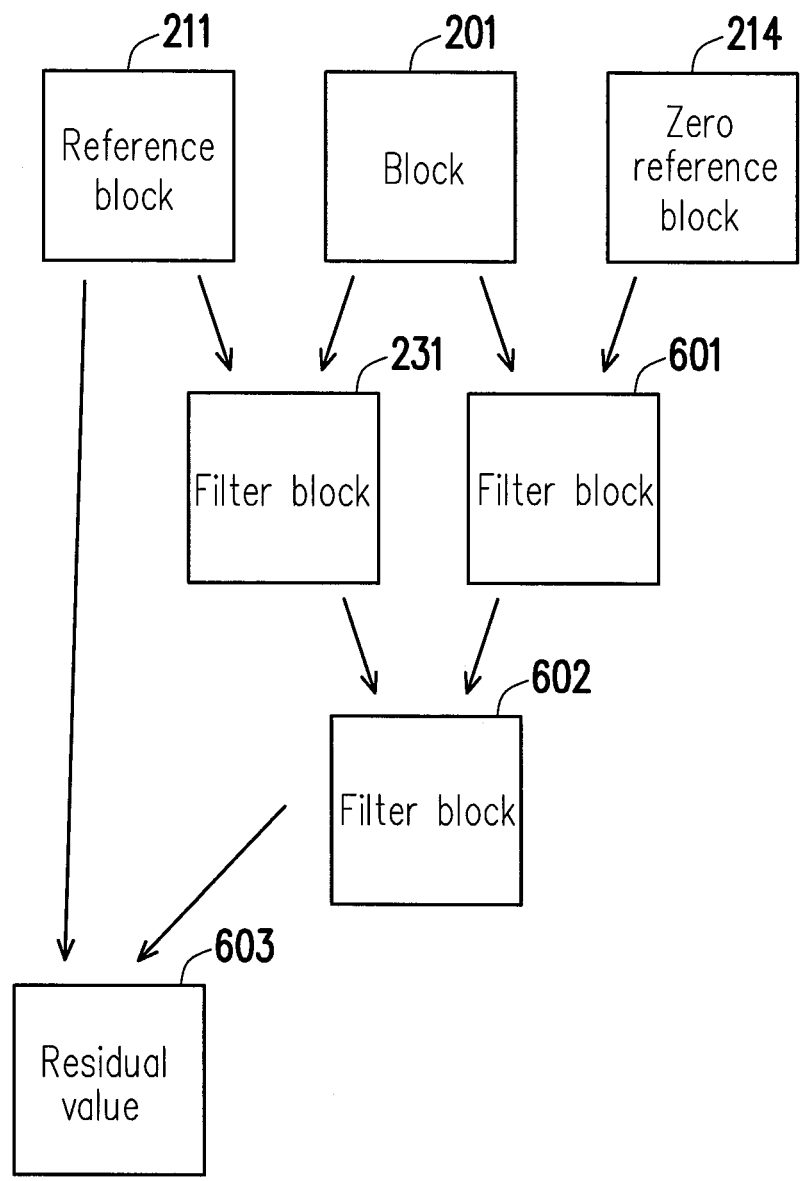
FIG. 6A is a schematic diagram of encoding a block according to a zero reference block according to an embodiment of the present invention.

FIG. 6A is a schematic diagram of encoding a block according to a zero reference block according to an embodiment of the present invention.

Referring to FIG. 6A with FIG. 3, it is assumed that after the motion estimation is completed, the difference value corresponding to the motion vector 221 is the minimum. After executing the filter calculation according to the reference block 211 and the block 201 by using the aforementioned formula (1) to obtain the filter block 231, the filter calculation circuit 114 further obtains the zero reference block 214. The filter calculation circuit 114 executes again the filter calculation according to the block 201 and the zero reference block to obtain a filter block 601 (i.e. a third filter block). Meanwhile, the filter calculation circuit 114 executes the filter calculation one more time according to the filter block 231 and the filter block 601 to obtain a filter block 602 (i.e. fourth filter block). Next, the residual value calculating circuit 150 calculates a residual value 603 between the reference block 211 and the filter block 602. The transforming and quantifying circuit 160 and the entropy coding circuit 170 then encode the residual value 603.

It is to be noted that in the embodiment illustrated in FIG. 6A, the filter calculation is executed for three times in total; however, the weights $w_1$ and $w_2$ in each time of the filter calculations may be different, but the present invention is not limited thereto.

Figure 6B:
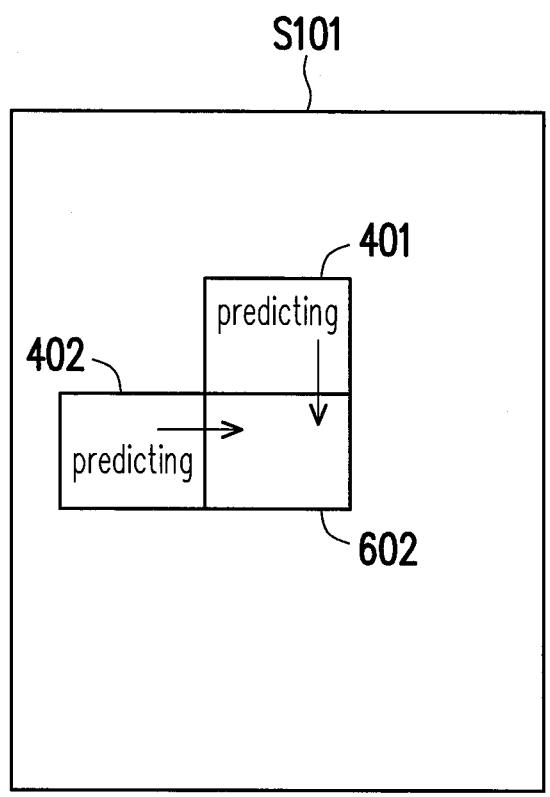
FIG. 6B is a schematic diagram illustrating an internal estimation according to a second embodiment of the present invention.

FIG. 6B is a schematic diagram illustrating an internal estimation according to the second embodiment of the present invention.

Referring to FIG. 6B, the filter block 602 is located at the position of the block 201. When encoding the block 201 by using the intra-predicting method, the intra-prediction and compensation circuit 130 obtains the blocks 401 and 402 adjacent to the block 201. The intra-prediction and compensation circuit 130 generates predicted a block according to the blocks 401 and 402. The residual value calculating circuit 150 calculates residual values between the predicted block and the filter block 602. Next, the transforming and quantifying circuit 160 and the entropy coding circuit 170 encode the residual values.

[Third Embodiment]

The third embodiment is similar to the first embodiment, and only the different places are described herein. In the third embodiment, after the motion estimation is completed, not only the filter calculation but also a detail preservation calculation are used to improve sharpness of the image.

Referring to the embodiment illustrated in FIG. 3 and taking the motion vector 221 for example, the motion estimation circuit 112 obtains the filter block 231 corresponding to the motion vector 211. Additionally, the filter calculation circuit 114 executes a detail preservation calculation according to the filter block 231 and the block 201 to generate a detail preservation block.

For example, the filter calculation circuit 114 first executes edge detection on the block 201 to obtain pixel values at the edge. The filter calculation circuit 114 may generate a detail preservation block by synthesizing the pixel values at the edge and the pixel values in the filter block 231 by a formula (2) as follows.

$$C''=w_1C+w_2C' \qquad (2)$$

Therein, C is a pixel value in the block 201. C' is a pixel value in the filter block 231. C" a pixel value in the detail preservation block.

However, in other embodiments, the filter calculation circuit 114 may add details of the block 201 into the filter block 231 by using any other algorithms, but the present invention is not limited thereto.

After the detail preservation block is obtained, the motion estimation circuit 112 calculates a difference value between the detail preservation block and the reference block 211. Besides, for the motion vectors 222 and 223, the motion estimation circuit 112 and the filter calculation circuit 114 may also obtain their corresponding difference values by the above-mentioned method.

Figure 7:
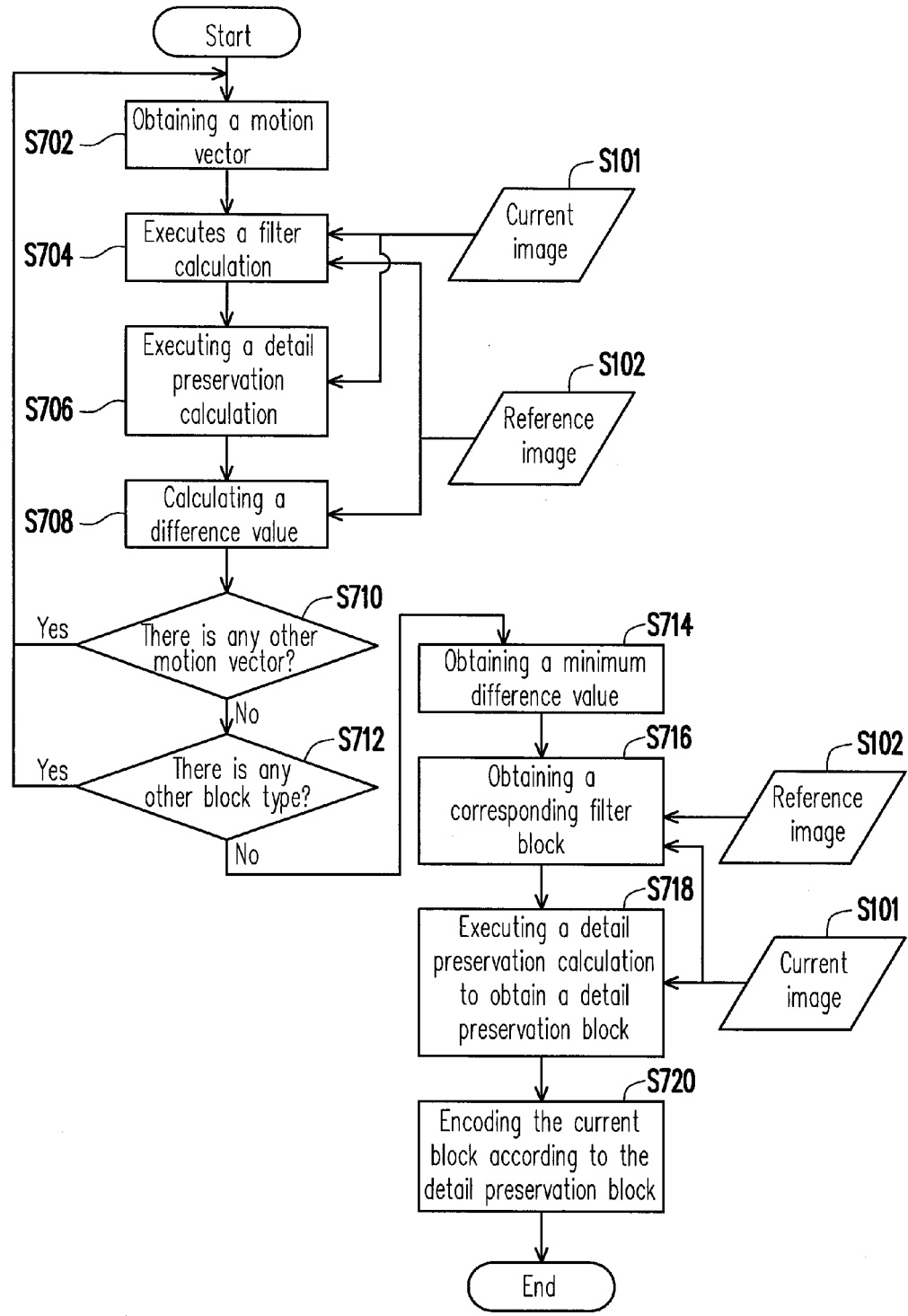
FIG. 7 is a flowchart illustrating a video encoding method according to a third embodiment of the present invention.

FIG. 7 is a flowchart illustrating a video encoding method according to the third embodiment of the present invention.

Referring to FIG. 7, in step S702, the motion estimation circuit 112 firstly obtains a motion vector.

In step S704, the filter calculation circuit 114 executes the filter calculation according to a block in the current image S101 and the reference block pointed to by the motion vector to generate a filter block.

In step S706, the filter calculation circuit 114 executes a detail preservation calculation according to the filter block and the block in the current image S101 to generate a detail preservation block.

In step S708, the motion estimation circuit 112 calculates a difference value between the reference block and the detail preservation block.

In step S710, the motion estimation circuit 112 determines whether there is any other motion vector to be calculated in a block type. If yes, the motion estimation circuit 112 returns to step S702, and if not, the motion estimation circuit 112 performs step S712.

In step S712, the motion estimation circuit 112 determines whether there is any other block type to be calculated. If yes, the motion estimation circuit 112 returns to step S702, and if not, the motion estimation circuit 112 performs step S714.

In step S714, the motion estimation circuit 112 obtains a minimum first difference value from multiple calculated difference values.

In step S716, the filter calculation circuit 114 obtains a filter block corresponding to the first difference value. In the present embodiment, the filter calculation circuit 114 recalculates the filter block according to the reference image S102 and the current image S10. However, in other embodiments, the filter calculation circuit 114 may also store the filter block in the memory 190 during previous step S704, and thus, the required filter block may be read from the memory 190 in step S716.

In step S718, the filter calculation circuit 114 executes a detail preservation calculation according to the filter block and a current block (e.g. the block 201) to obtain a detail preservation block.

In step S720, the encoding circuit 122 encodes the current block according to the detail preservation block. For example, the residual value calculating circuit 150 calculates a residual value between a corresponding reference block (e.g. the reference block 211) and the detail preservation block. The transforming and quantifying circuit 160 and the entropy coding circuit 170 encode the residual value. Or otherwise, the encoding circuit 122 may encode the current block by using a zero reference block again as disclosed in the second embodiment, but the present invention is not limited thereto.

Each step of FIG. 7 has been described in detail in above and will not be repeated hereinafter.

[Fourth Embodiment]

The fourth embodiment is similar to the first embodiment, and only the different places are described herein. In the first exemplary embodiment, the filter calculation circuit 114 executes the filter calculation on each motion vector of each block type. However, in the fourth embodiment, the filter calculation circuit 114 executes the filter calculation only once on each block type.

Figure 8:
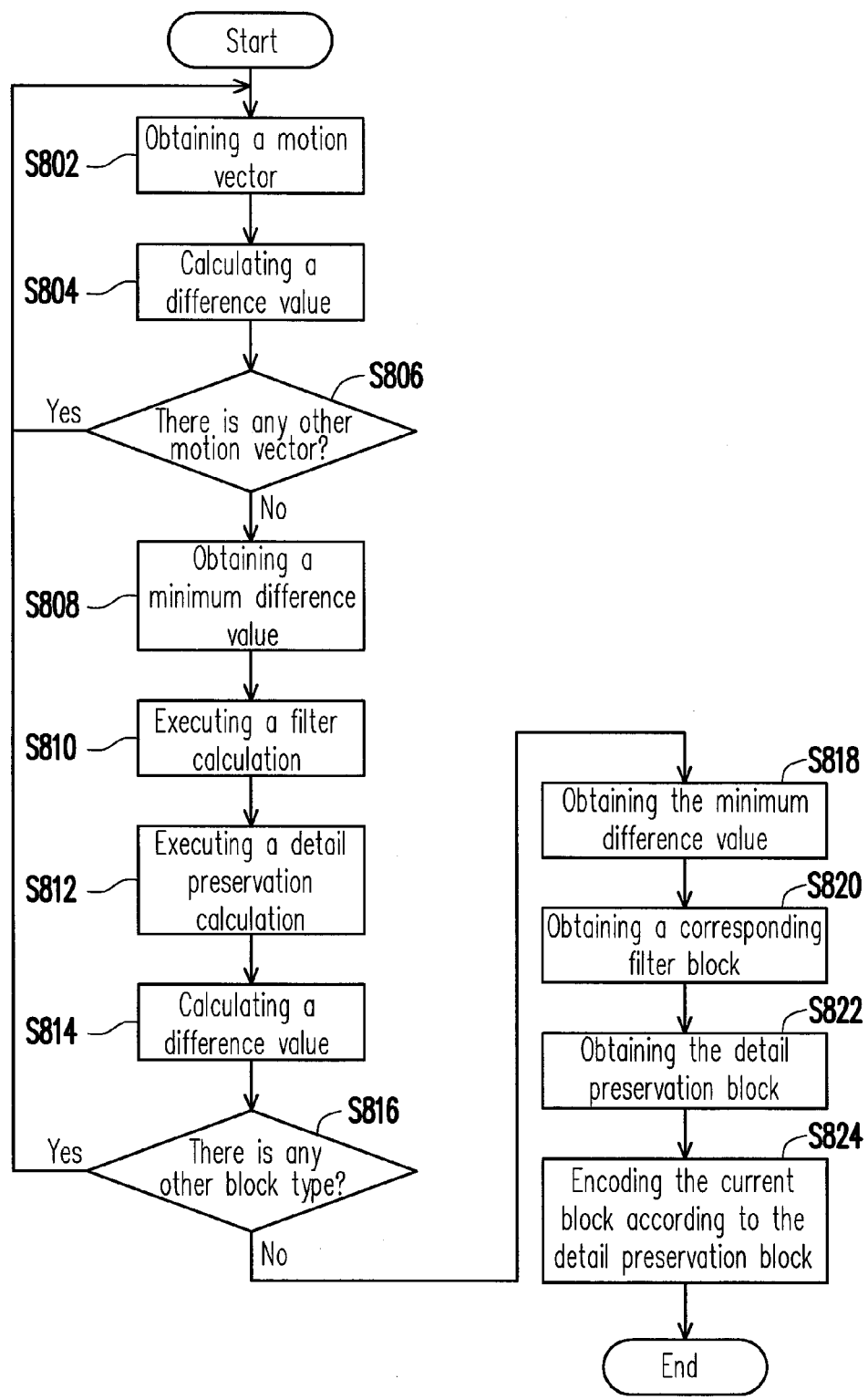
FIG. 8 is a flowchart illustrating a video encoding method according to a fourth embodiment of the present invention.

FIG. 8 is a flowchart illustrating a video encoding method according to the fourth embodiment of the present invention.

Referring to FIG. 8, in step S802, the motion estimation circuit 112 obtains a motion vector (i.e. the first motion vector).

In step S804, the motion estimation circuit 112 calculates a difference value (i.e. the first difference value) between the pointed reference block (i.e. the first reference block) and the current block according to the motion vector.

In step S806, the motion estimation circuit 112 determines whether there is any other motion vector. If yes, the motion estimation circuit 112 returns to step S802, and if not, the motion estimation circuit 112 performs step S808.

In step S808, the motion estimation circuit 112 selects a minimum difference value (i.e. a second difference value) from the currently generated difference values and obtains a motion vector (i.e. a second motion vector) corresponding the minimum difference value.

In step S810, the filter calculation circuit 114 obtains a reference block according to the motion vector obtained in step S808, and executes the filter calculation according to the reference block and a block currently to be encoded to generate a filter block.

In step S812, the filter calculation circuit 114 executes the detail preservation calculation according to the filter block and the block currently to be encoded to generate a detail preservation block.

In step S814, the filter calculation circuit 114 calculates a difference value between the detail preservation block and the corresponding reference block.

In step S816, the motion estimation circuit 112 determines whether there is any other block type to be calculated. If yes, the motion estimation circuit 112 returns to step S802, and if not, the motion estimation circuit 112 performs step S818.

In step S818, the motion estimation circuit 112 selects a minimum difference value from the generated difference values (the number of the generated difference values is equal to the number of the block types). In step S820, the filter calculation circuit 114 obtains a filter block corresponding to the minimum difference value. In step S822, the filter calculation circuit 114 obtains a detail preservation block corresponding to the minimum difference value. In step S824, the encoding circuit 122 encodes the current block according to the detail preservation block.

Each step of FIG. 8 has been described in detail in above and will not be repeated hereinafter.

[Fifth Embodiment]

The fifth embodiment is similar to the first embodiment, and only the different places are described herein. In the fifth embodiment, a motion vector may be divided as a coarse motion vector and a fined motion vector. After completing searching the coarse motion vector, the motion estimation circuit 112 executes the filter calculation and then continues to search the fined motion vector.

Figure 9:
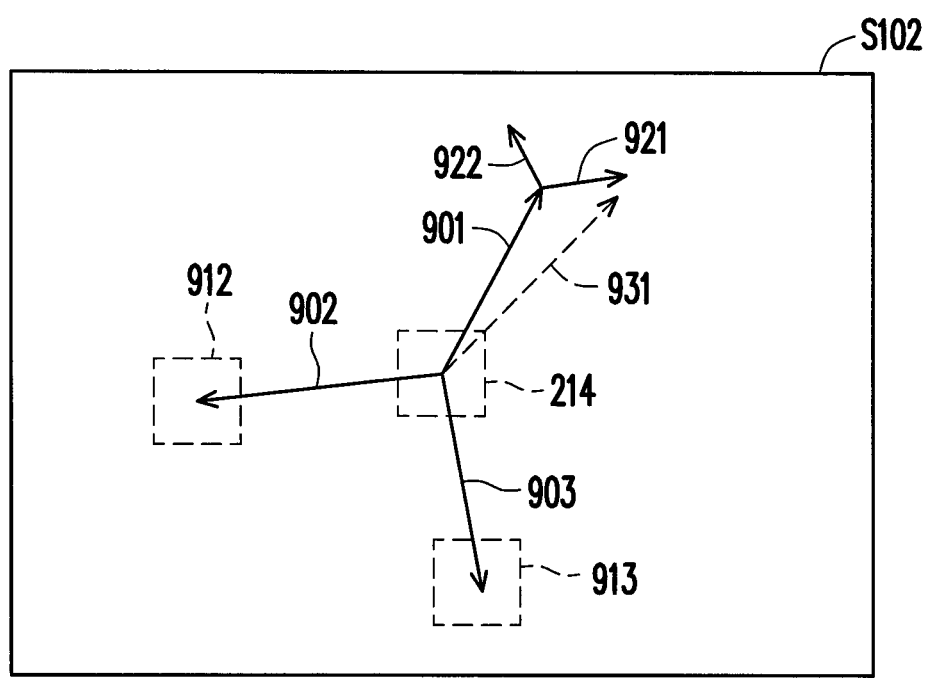
FIG. 9 is a schematic diagram illustrating a coarse motion vector and a fined motion vector according to an embodiment of the present invention.

FIG. 9 is a schematic diagram illustrating a coarse motion vector and a fined motion vector according to an embodiment of the present invention.

Referring to FIG. 9, during the motion estimation, the motion estimation circuit 112 firstly generates coarse motion vectors 901~903. Each of the coarse motion vectors points to a reference block (i.e. the second reference block), such as blocks 912 and 913. The motion estimation circuit 112 calculates a difference value (i.e. the third difference value) between the reference block pointed to by coarse motion vector and the current block (i.e. the block 201). The motion estimation circuit 112 identifies a minimum difference value (i.e. the fourth difference value) form these difference values. It is assumed that the minimum difference value corresponds to the coarse motion vector 901 (i.e. the first coarse motion vector, now). The motion estimation circuit 112 further generates fined motion vectors 921 and 922 and generates a plurality of motion vector according to the fined motion vectors 921~922 and the coarse motion vectors 901. For example, the motion estimation circuit 112 adds the fined motion vector 921 with the coarse motion vector 901 to generate a motion vector 931. In other words, the motion estimation circuit 112 performs a large-range searching by using the coarse motion vectors and then performs a small-range searching by using the fined motion vectors.

For example, both a horizontal component and a vertical component of the coarse motion vector 901 are integers, while both a horizontal component and a vertical component of the fined motion vector 902 are decimals smaller than 1. However, in another embodiment, both the horizontal component and the vertical component of the coarse motion vector 901 are greater than a threshold value (e.g. 3 pixel values), while both the horizontal component and the vertical component of the fined motion vector 902 are smaller than such threshold value, but the present invention is not limited thereto. Otherwise, a motion vector may be composed of multiple coarse motion vectors and multiple fined motion vectors, but the present invention is not limited thereto.

Figure 10:
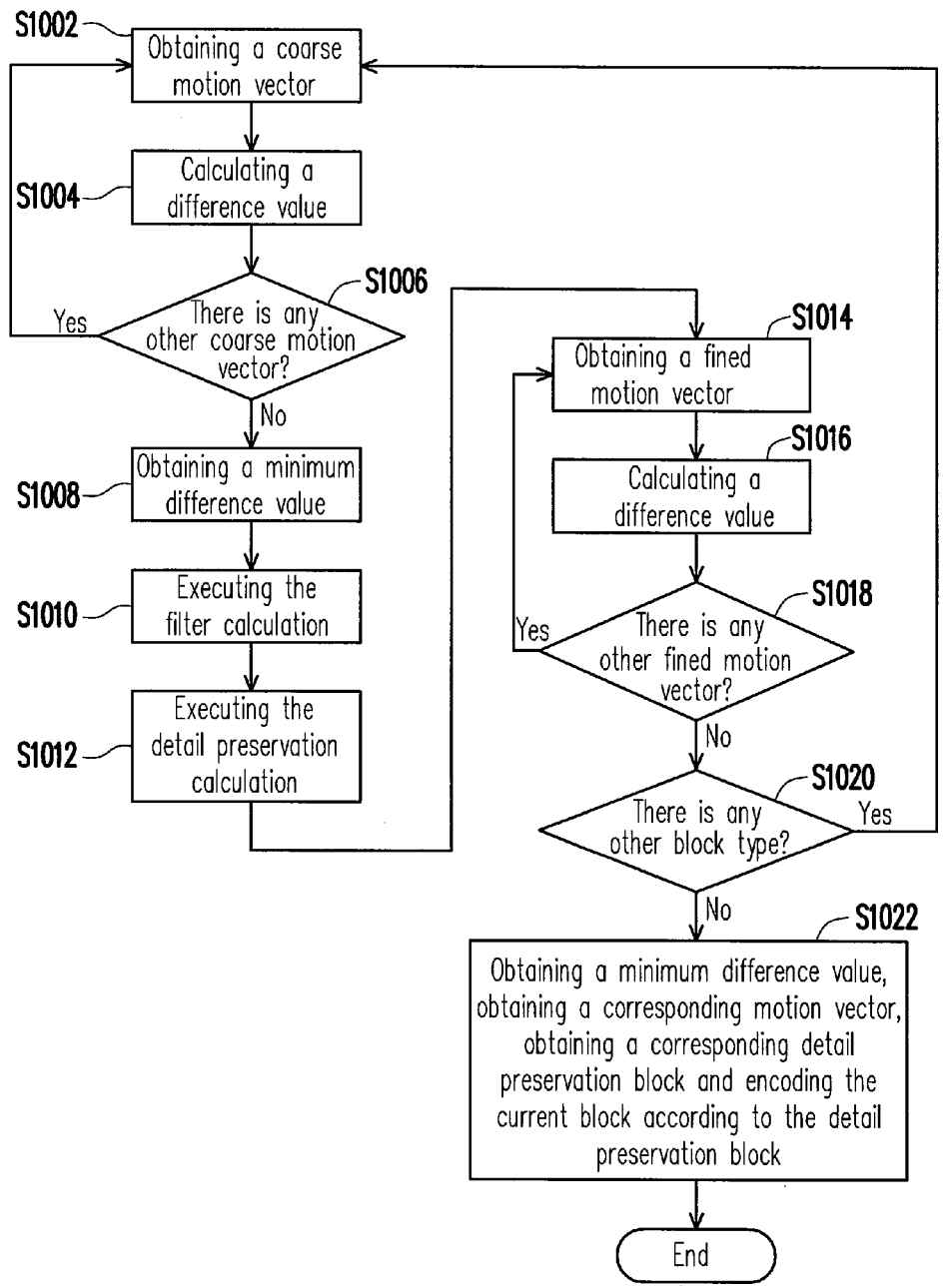
FIG. 10 is a flowchart illustrating a video encoding method according to a fifth embodiment of the present invention.

FIG. 10 is a flowchart illustrating a video encoding method according to the fifth embodiment of the present invention.

Referring to FIG. 10, in step S1002, the motion estimation circuit 112 firstly obtains a coarse motion vector.

In step S1004, the motion estimation circuit 112 calculates a difference value between the pointed reference block and a currently encoded block (i.e. a fourth block) according to the coarse motion vector.

In step S1006, the motion estimation circuit 112 determines whether there is any other coarse motion vector. If yes, the motion estimation circuit 112 returns to step S1002, and if, not, the motion estimation circuit 112 performs step S1008.

In step S1008, the motion estimation circuit 112 obtains a minimum difference value from multiple difference values generated according to the coarse motion vectors and obtains the corresponding coarse motion vector.

In S1010, the filter calculation circuit 114 executes the filter calculation according to the reference block and the currently encoded block to obtain a filter block (i.e. the second filter block), wherein the reference block is the reference block (i.e. the first reference block) pointed to by the coarse motion vector obtained in step S1008.

In step S1012, the filter calculation circuit 114 executes the detail preservation calculation according to the obtained filter block and the current block to generate a detail preservation block.

In step S1014, the motion estimation circuit 112 obtains a fined motion vector, and adds the fined motion vector with the coarse motion vector obtained in step S1008 so as to obtain a new motion vector (i.e. the first motion vector).

In step S1016, the motion estimation circuit 112 obtains a reference block (i.e. the second reference block) pointed to by the new motion vector and calculates a difference value (i.e. the third difference value) according to the reference block and the current block.

In step S1018, the motion estimation circuit 112 determines whether there is any other fined motion vector. If yes, the motion estimation circuit 112 returns to step S1014, and if not, the motion estimation circuit 112 performs step S1020.

In step S1020, the motion estimation circuit 112 determines whether there is any other block type. If yes, the motion estimation circuit 112 returns to step S1002, and if not, performs step S1022.

In step S1022, the motion estimation circuit 112 obtains a minimum difference value (i.e. the fourth difference value) from multiple difference values (whose number is equal to the number of the block types multiplied by the number of the fined motion vectors in one block type) and obtains a corresponding motion vector. Such motion vector points to a reference block. The filter calculation circuit 114 executes the filter calculation according to the reference block and the current block to generate a filter block, then, generates a detail preservation block (i.e. the first detail preservation block) according to the filter block and the previous block and finally, encodes the current block according to the first detail preservation block.

However, each step of FIG. 10 has been described in detail in above and will not be repeated hereinafter.

[Sixth Embodiment]

The sixth embodiment is similar to the fifth embodiment, and only the different places are described herein.

Figure 11:
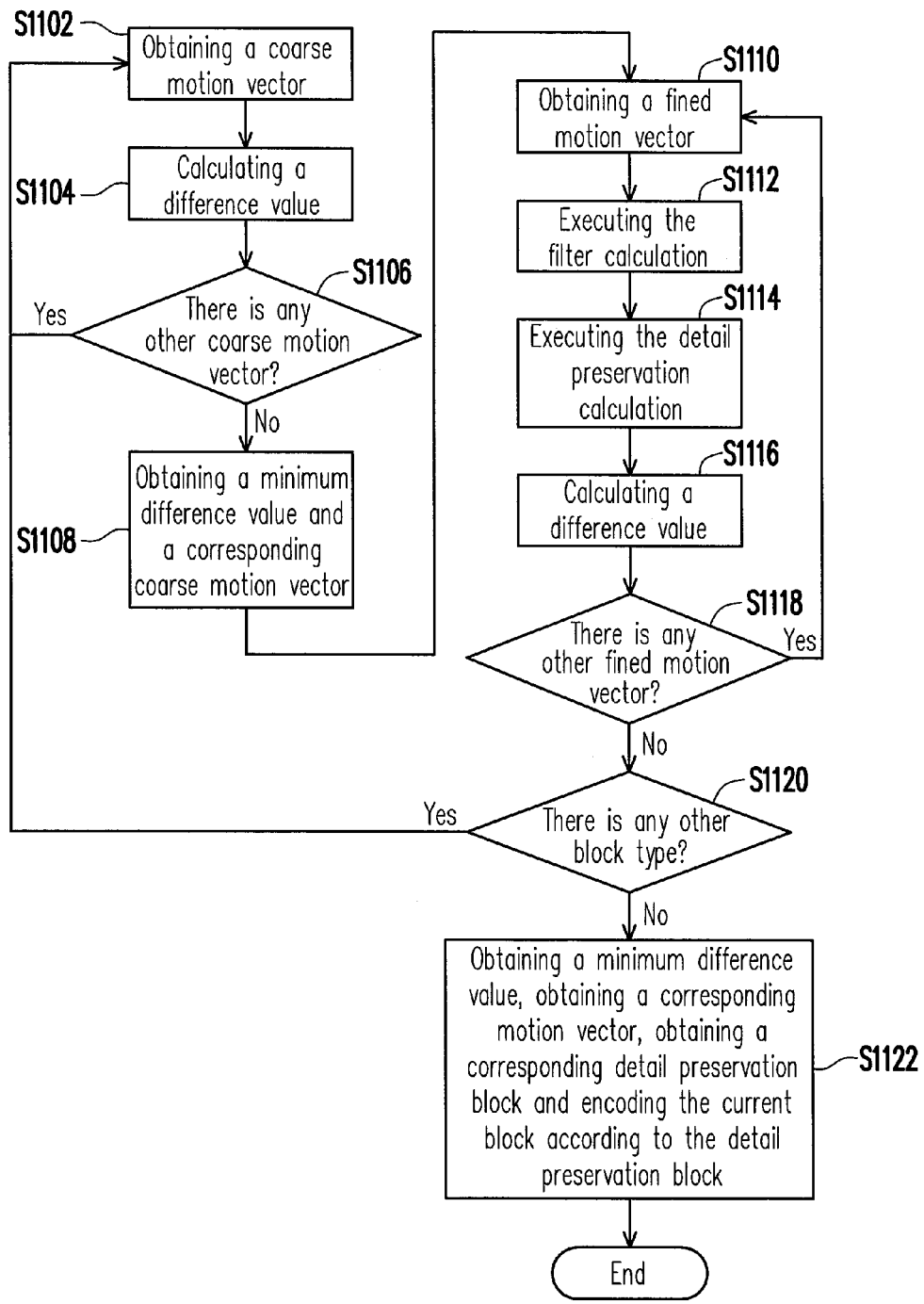
FIG. 11 a flowchart illustrating a video encoding method according to a sixth embodiment of the present invention.

FIG. 11 a flowchart illustrating a video encoding method according to the sixth embodiment of the present invention.

Referring to FIG. 11, in step S1102, the motion estimation circuit 112 obtains a coarse motion vector.

In step S1104, the motion estimation circuit 112 calculates a difference value according to the coarse motion vector.

In step S1106, the motion estimation circuit 112 determines whether there is any other coarse motion vector. If yes, the motion estimation circuit 112 returns to step S1102, and if not, the motion estimation circuit 112 performs step S1108.

In step S1108, the motion estimation circuit 112 obtains a minimum difference value from the generated difference values and obtains a corresponding coarse motion vector.

In step S1110, the motion estimation circuit 112 obtains a fined motion vector and adds the same with the coarse motion vector obtained in step S1108 to generate a new motion vector.

In step S1112, the filter calculation circuit 114 executes the filter calculation according to the new motion vector to generate a filter block.

In step S1114, the filter calculation circuit 114 executes the detail preservation calculation according to the filter block and a block currently to be encoded to generate a detail preservation block.

In step S1116, the motion estimation circuit 112 obtains a reference block according to the new motion vector and calculates a difference value between the reference block and the detail preservation block.

In step S118, the motion estimation circuit 112 determines whether there is any other fined motion vector. If yes, the motion estimation circuit 112 returns to step S1110, and if not, the motion estimation circuit 112 performs step S1120.

If step S1120, the motion estimation circuit 112 determines whether there is any other block type. If yes, the motion estimation circuit 112 returns to step S1102, and if not, the motion estimation circuit 112 performs step S1122.

In step S1122, the motion estimation circuit 112 obtains a minimum difference value from the generated difference values (whose number is equal to the number of the block types multiplied by the number of the fined motion vectors in each block type). The filter calculation circuit 114 obtains a filter block and a detail preservation block corresponding thereto. Lastly, the encoding circuit 122 encodes the current block according to the detail preservation block.

However, each step of FIG. 11 has been described in detail in above and will not be repeated hereinafter.

In another embodiment, functions of each circuit in the video encoding device 100 may be implemented as a plurality of codes. The codes are stored in a memory and executed by a processor. The present invention is not intent to limit to being implemented by hardware or software.

To summarize, in the video encoding method and the video encoding system provided by the embodiments of the present invention, the filter calculation can be added in during the motion estimation. Thus, the motion vector identified by the motion estimation is the motion vector calculated by the filter calculation and having the highest compression ratio. Accordingly, the video quality and the compression ratio can be improved.

The previously described exemplary embodiments of the present invention have the advantages aforementioned, wherein the advantages aforementioned not required in all versions of the invention.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A video encoding method for a video encoding device, comprising:
    obtaining a current image and a reference image, wherein the current image comprises a first block to be encoded;
    obtaining a plurality of motion vectors which are with respect to the first block, wherein each of the motion vectors points to a reference block in the reference image;
    executing a filter calculation according to the pointed reference block and the first block to generate a first filter block for each of the motion vectors and calculating a difference value between the pointed reference block and the corresponding first filter block;
    obtaining a minimum first difference value among the difference values and obtaining a second filter block corresponding to the first difference value among the first filter blocks; and
    encoding the first block according to the second filter block, comprising:
        obtaining a zero reference block from the reference image, wherein a coordinate of the zero reference block in the reference image is equal to a coordinate of the first block in the current image;
        executing the filter calculation according to the zero reference block and the first block to obtain a third filter block;
        executing the filter calculation according to the second filter block and the third filter block to obtain a fourth filter block; and
        executing one of a first step and a second step,
        wherein the first step comprises:
            obtaining a first reference block among the reference blocks, wherein the first reference block corresponds to the second filter block; and
            encoding a first residual value between the first reference block and the fourth filter block,
        wherein the second step comprises:
            obtaining a second block adjacent to the first block in the current image; and
            estimating the fourth filter block according to the second block to obtain a second residual value and encoding the second residual value.

2. The video encoding method according to claim 1,
    wherein the step of calculating the difference value according to the pointed reference block and the corresponding first filter block for each of the motion vectors comprises:
        executing a detail preservation calculation according to the corresponding first filter block and the first block to obtain a detail preservation block; and
        calculating the difference value between the detail preservation block and the pointed reference block,
    wherein the step of encoding the first block according to the second filter block comprises:
        obtaining a first reference block corresponding to the second filter block among the reference blocks;
        obtaining the detail preservation block corresponding to the second filter block; and
        encoding a third residual value between the detail preservation block and the first reference block.

3. The video encoding method according to claim 1, wherein before the step of obtaining the plurality of motion vectors, the method comprises:
    obtaining a plurality of coarse motion vectors, wherein each of the coarse motion vectors points to a second reference block in the reference image;
    calculating a third difference value between the pointed second reference block and the first block for each of the coarse motion vectors;
    obtaining a minimum fourth difference value among the third difference values and obtaining a first coarse motion vector corresponding to the fourth difference value among the coarse motion vectors; and
    obtaining a plurality of fined motion vectors and generating the motion vectors according to the fined motion vectors and the first coarse motion vector.

4. The video encoding method according to claim 3, wherein a horizontal component and a vertical component of each of the coarse motion vectors are integers, and a horizontal component and a vertical component of each of the fined motion vectors are decimals smaller than 1.

5. The video encoding method according to claim 1, further comprising:
   obtaining a coarse motion vector and a fourth block in the current image, wherein the coarse motion vector points to a first reference block in the reference image;
   executing the filter calculation according to the first reference block and the fourth block to obtain a second filter block;
   executing a detail preservation calculation according to the second filter block and the fourth block to obtain a detail preservation block;
   generating a plurality of first motion vectors according to the coarse motion vector, wherein each of the first motion vectors points to a second reference block in the reference image;
   calculating a third difference value between each of the second reference blocks and the detail preservation block;
   obtaining a minimum fourth difference value among the third difference values and obtaining a first detail preservation block corresponding to the fourth difference value; and
   encoding the fourth block according to the first detail preservation block.

6. The video encoding method according to claim 1, wherein the first block belongs to one of multiple block types, and wherein before the step of obtaining the motion vectors, the video encoding method further comprises:
   obtaining a plurality of first motion vectors belonging to each of the multiple block types, wherein each of the first motion vectors points to a first reference block in the reference image;
   calculating a first difference value according to the pointed first reference block and the first block for each of the first motion vectors belonging to each of the block types; and
   obtaining a minimum second difference value among the first difference values and obtaining a second motion vector corresponding to the second difference value among the first motion vectors for each of the block types,
   wherein the second motion vectors are the motion vectors.

7. A video encoding device, comprising:
   a motion estimation circuit, configured to obtain a current image and a reference image, wherein the current image comprises a first block to be encoded;
   a filter calculation circuit, coupled to the motion estimation circuit and configured to execute a filter calculation; and
   an encoding circuit, coupled to the motion estimation circuit and the filter calculation circuit,
   wherein the motion estimation circuit is configured to obtain a plurality of motion vectors which are with respect to the first block, wherein each of the motion vectors points to a reference block in the reference image;
   wherein for each of the motion vectors, the filter calculation circuit is configured to execute the filter calculation between the pointed reference block and the first block to generate a first filter block, and the motion estimation circuit is configured to calculate an difference value according to the pointed reference block and the corresponding first filter block,
   wherein the motion estimation circuit is configured to obtain a minimum first difference value among the difference values, and the filter calculation circuit is configured to obtain a second filter block corresponding to the first difference value among the first filter blocks; and
   wherein the encoding circuit is configured to encode the first block according to the second filter block,
   wherein the filter calculation circuit is further configured to obtain a zero reference block in the reference image, wherein a coordinate of the zero reference block in the reference image is equal to a coordinate of the first block in the current image,
   wherein the filter calculation circuit is further configured to execute the filter calculation according to the zero reference block and the first block to obtain a third filter block and execute the filter calculation according to the second filter block and the third filter block to obtain a fourth filter block,
   wherein the encoding circuit is further configured to obtain a first reference block corresponding to the second filter block among the reference blocks and encode a first residual value between the first reference block and the fourth filter block,
   or the encoding circuit is further configured to obtain a second block adjacent to the first block in the current image, estimate the fourth filter block according to the second block to obtain a second residual value and encode the second residual value.

8. The video encoding device according to claim 7, wherein for each of the motion vectors, the filter calculation circuit is further configured to execute a detail preservation calculation according to the corresponding first filter block and the first block to obtain a detail preservation block, and the motion estimation circuit is further configured to calculate the difference value between the detail preservation block and the pointed reference block, and
   wherein the encoding circuit is further configured to obtain a first reference block among the reference blocks, wherein the first reference block corresponds to the second filter block, obtain the detail preservation block corresponding to the second filter block and encode a third residual value between the detail preservation block and the first reference block.

9. The video encoding device according to claim 7, wherein the motion estimation circuit is further configured to obtain a plurality of coarse motion vectors, wherein each of the coarse motion vectors points to a second reference block in the reference image,
   wherein for each of the coarse motion vectors, the motion estimation circuit is further configured to calculate a third difference value between the pointed second reference block and the first block,
   wherein the motion estimation circuit is further configured to obtain a minimum fourth difference value among the third difference values, obtain a first coarse motion vector corresponding to the fourth difference value among the coarse motion vectors, obtain a plurality of fined motion vectors and generate the motion vectors according to the fined motion vectors and the first coarse motion vector.

10. The video encoding device according to claim 9, wherein a horizontal component and a vertical component of each of the coarse motion vectors are integers, and a horizontal component and a vertical component of each of the fined motion vectors are decimals smaller than 1.

11. The video encoding device according to claim 7, wherein the motion estimation circuit is further configured to obtain a coarse motion vector and a fourth block in the current image, wherein the coarse motion vector points to a first reference block in the reference image,
- wherein the filter calculation circuit is further configured to execute the filter calculation according to the first reference block and the fourth block to obtain a second filter block and execute a detail preservation calculation according to the second filter block and the fourth block to obtain a detail preservation block,
- wherein the motion estimation circuit is further configured to generate a plurality of first motion vectors according to the coarse motion vector, wherein each of the first motion vectors points to a second reference block in the reference image,
- wherein the motion estimation circuit is further configured to calculate a third difference value between each of the second reference blocks and the detail preservation block and obtain a minimum fourth difference value among the third difference values, and
- wherein the encoding circuit is further configured to obtain a first detail preservation block corresponding to the fourth difference value and encode the fourth block according to the first detail preservation block.

12. The video encoding device according to claim 7, wherein the first block belongs to one of multiple block types,
- wherein the motion estimation circuit is further configured to obtain a plurality of first motion vectors belonging to each of the multiple block types, wherein each of the first motion vectors points to a first reference block in the reference image,
- wherein for each of the first motion vectors belonging to each of the block types, the motion estimation circuit is further configured to calculate a first difference value according to the pointed first reference block and the first block,
- wherein for each of the block types, the motion estimation circuit is further configured to obtain a minimum second difference value among the first difference values and obtain a second motion vector among the first motion vectors, wherein the second motion vector corresponds to the second difference value, and
- wherein the second motion vectors are the motion vectors.

* * * * *